US012273413B2

(12) United States Patent
Al-Dalky et al.

(10) Patent No.: US 12,273,413 B2
(45) Date of Patent: Apr. 8, 2025

(54) LOAD MANAGEMENT FOR SERVERS IN SHARED ADDRESS NETWORK ARCHITECTURE

(71) Applicant: Microsoft Technology Licensing, LLC, Redmond, WA (US)

(72) Inventors: Rami Y. Al-Dalky, Redmond, WA (US); Nalin Raj Gupta, Everett, WA (US); Abhishek Agarwal, Issaquah, WA (US); Pradeepkumar Mani, Issaquah, WA (US); Pranav Agarwal, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/311,355

(22) Filed: May 3, 2023

(65) Prior Publication Data

US 2024/0372912 A1 Nov. 7, 2024

(51) Int. Cl.
*H04L 67/1008* (2022.01)
*H04L 67/1012* (2022.01)
*H04L 67/1021* (2022.01)

(52) U.S. Cl.
CPC ...... *H04L 67/1008* (2013.01); *H04L 67/1012* (2013.01); *H04L 67/1021* (2013.01)

(58) Field of Classification Search
CPC ............. H04L 67/1008; H04L 67/1012; H04L 67/1021
USPC ........................................................ 709/203
See application file for complete search history.

(56) References Cited

U.S. PATENT DOCUMENTS

| 10,542,078 B1* | 1/2020 | Farrugia | G06F 16/90 |
| 10,848,461 B2* | 11/2020 | Hira | H04L 41/0894 |
| 2002/0194335 A1* | 12/2002 | Maynard | G06F 11/3495 |
| | | | 709/225 |
| 2010/0011126 A1* | 1/2010 | Hsu | H04L 67/1008 |
| | | | 709/249 |
| 2010/0153558 A1* | 6/2010 | Kommula | H04L 61/4511 |
| | | | 718/105 |

(Continued)

OTHER PUBLICATIONS

Flavel, et al., "FastRoute: A Scalable Load-Aware Anycast Routing Architecture for Modern CDNs", In Proceedings of USENIX Symposium on Networked Systems Design and Implementation, May 4, 2015, pp. 381-394.

(Continued)

*Primary Examiner* — David P Zarka
(74) *Attorney, Agent, or Firm* — Holzer Patel Drennan

(57) ABSTRACT

A system for load management in a shared address networking architecture includes a primary point-of-presence (POP) group of servers configured to serve content of a domain and that are each reachable at an address of a first IP address block and a secondary PoP group of servers configured to serve the content of the domain and that are each reachable at an address of a second IP address block. The system further includes a traffic management agent configured to reduce a total volume of incoming requests received by the primary PoP group for a period of time following a return of a first server in the primary PoP group of servers to an online state by selectively directing a first percentage of the incoming requests to the second IP address block instead of the first IP address block.

17 Claims, 4 Drawing Sheets

(56) References Cited

U.S. PATENT DOCUMENTS

| | | | | |
|---|---|---|---|---|
| 2011/0218689 | A1* | 9/2011 | Chan | G16Z 99/00 |
| | | | | 710/305 |
| 2011/0307541 | A1* | 12/2011 | Walsh | H04L 67/1034 |
| | | | | 709/227 |
| 2013/0204978 | A1* | 8/2013 | Fleischman | H04L 61/4511 |
| | | | | 709/219 |
| 2015/0081926 | A1* | 3/2015 | White | H04L 61/5007 |
| | | | | 709/245 |
| 2016/0173440 | A1* | 6/2016 | Stahura | G06F 16/9537 |
| | | | | 709/245 |
| 2017/0104714 | A1* | 4/2017 | Naidu | H04L 67/1014 |
| 2017/0126534 | A1* | 5/2017 | Cimino | H04L 67/563 |
| 2017/0149918 | A1* | 5/2017 | Chang | H04L 65/611 |
| 2018/0191625 | A1* | 7/2018 | Golshan | H04L 47/125 |
| 2018/0367501 | A1* | 12/2018 | Khan | H04L 61/5007 |
| 2020/0076766 | A1* | 3/2020 | Maslak | H04L 61/5007 |
| 2020/0267086 | A1 | 8/2020 | Sawyer et al. | |
| 2022/0237203 | A1* | 7/2022 | Das | H04L 63/0807 |
| 2022/0321479 | A1 | 10/2022 | Calder | |
| 2022/0394088 | A1* | 12/2022 | Salkintzis | H04L 61/4511 |
| 2022/0400098 | A1* | 12/2022 | Rao | H04L 67/1023 |

OTHER PUBLICATIONS

Fu, et al., "Taming the Wild: A Scalable Anycast-Based CDN Architecture (T-SAC)", In Journal of IEEE Journal on Selected Areas in Communications, vol. 36, Issue 12, Sep. 19, 2018, pp. 2757-2774.

Lai, et al., "Man-In-the-Middle Anycast (MIMA): CDN User-Server Assignment Becomes Flexible", In Proceedings of IEEE 41st Conference on Local Computer Networks, Nov. 7, 2016, pp. 451-459.

Sinha, et al., "Distributed Load Management Algorithms in Anycast-based CDNs", In Journal of Computer Networks, vol. 115, Mar. 14, 2017, pp. 1-15.

Wei, et al., "A Spectrum-Efficient Algorithm Based on Traffic Splitting and Merging Transmission for Anycast In Inter-Datacenter Elastic Optical Networks", In Journal of Photonic Network Communications, vol. 35, Nov. 2, 2017, pp. 165-176.

* cited by examiner

LOAD MANAGEMENT FOR SERVERS IN SHARED ADDRESS NETWORK ARCHITECTURE

BACKGROUND

Anycast is a network addressing and routing methodology used for speedy delivery of website content. Instead of using a unique internet protocol (IP) address to identify each different destination, Anycast uses an addressing scheme in which a single destination IP address is shared by multiple servers, such as a group of servers distributed across multiple different cities or countries. The Border Gateway Protocol (BGP) is a protocol implemented by a network of routers that is used to determine the fastest path between a data source and a given destination IP address. When a user makes a request to a service using Anycast, the BGP selects the lowest latency path for the request out of the servers available within the Anycast network.

Take, for example, the scenario where there exist ten remotely-located servers configured to serve content for a particular web domain. If the servers and web domain have been configured to use Anycast, all of these ten servers are assigned an identical internet protocol (IP) address. When a client device located in Seattle transmits a request to access the web domain, the request is resolved to the IP address and the BGP router network then identifies which of ten servers can presently be reached with lowest latency from the client location in Seattle. This lowest-latency server is then selected to service the request. For example, the "lowest-latency server" may be a server that is geographically most proximal to Seattle or, if that server is experiencing high traffic, another server that can be reached with lower latency. Benefits of Anycast addressing scheme include high server availability, automated load balancing (e.g., by virtue of the BGP selecting the lowest latency device rather than a closest device), and shorter access times.

In order to become "available" to receive Anycast traffic, a processing node announces its "route" to the BGP (e.g., by transmitting its IP address and information usable to identify a path between the processing node and each BGP router than receives the announcement). One shortcoming of Anycast is that a server node can very quickly be overwhelmed by a large volume of traffic as soon as the server node announces its route to the BGP. This large amount of traffic all at once can pull the server node into an unhealthy state (e.g., excessive CPU usage, low available memory), creating availability issues for customers.

SUMMARY

According to one implementation, a method of server load management includes receiving requests to access a domain associated with a primary point-of-presence (POP) group of servers and a secondary POP group of servers. Each server in the primary PoP group is reachable via a first internet protocol (IP) address block and each server in the secondary PoP group being reachable via a second IP address block. The method includes detecting return of a first server in the primary POP to an online state after the first server has been offline for a period of time and, in response, reducing a total volume of incoming requests received by the first POP group by selectively directing a first percentage of the incoming requests to the second IP address block instead of the first IP address block for a period of time following return of the first server to the online state.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

The herein disclosed technology includes a traffic management agent that performs load management actions on behalf of domain providers utilizing Anycast addressing. According to one implementation, the disclosed load management actions protect a server that is just returning to an online state by deflecting a portion of incoming traffic away from the server for a period of time following initial announcement of the server's route to the Border Gateway Protocol (BGP) router network. These load management actions prevent the server from being pulled into an unhealthy state due to the surge of traffic that is otherwise likely to be received in the moments following the server's route announcement.

Figure 1:
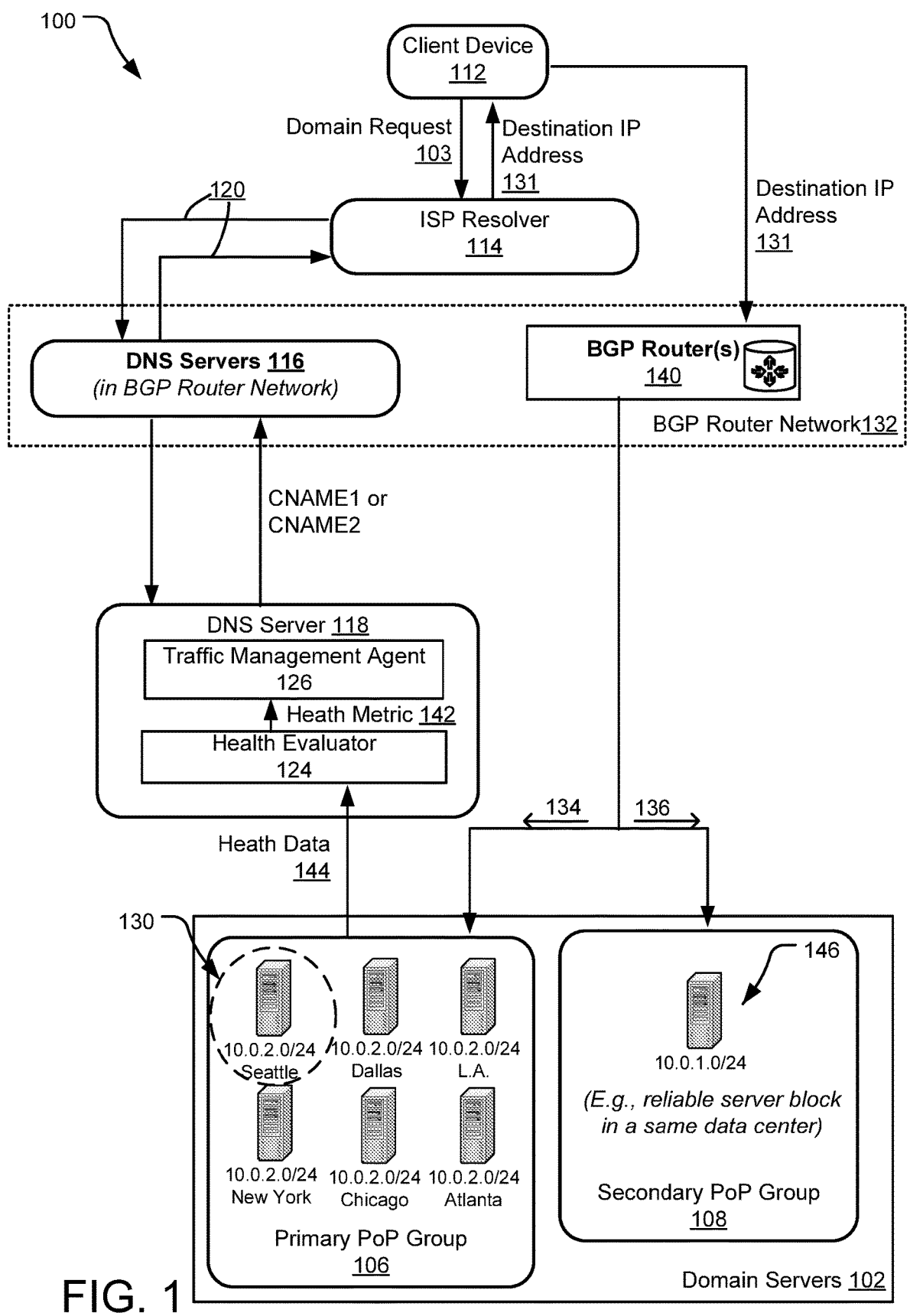
FIG. 1 illustrates an example system that performs load management actions in a shared address network architecture.

FIG. 1 illustrates an example system 100 that performs load management actions for servers in a shared address network architecture. By example, FIG. 1 illustrates traffic flows to and from servers of a single domain. Content of the domain is served by a collection of domain servers 102.

The domain servers 102 of the domain are divided among two different groups including a primary point-of-presence (POP) group 106 and a secondary PoP group 108. In the following description, a POP server group refers to a group of servers configured to serve content of a same domain and that are all associated with a same IP address block (e.g., prefix). For example, every server in the primary POP server group 106 is assigned to a single one of the addresses in the address block 10.0.2.0/24. Although not necessary to implementation, a primary POP group 106 is often configured to include multiple server pools in different geographic locations. For example, the primary POP server group 106 includes a first POP server pool 130 consisting of a pool of servers located at a data center in Seattle while other POP server pools of the same domain are located in Dallas, Los Angeles, New York, Chicago, and Atlanta, respectively. Each of these different server pools in a different geographic location includes servers individually configured to serve content of the domain that are each assigned an address from the same block 10.0.2.0/24 (e.g., notation meaning 10.0.2.0.1-10.0.2.0.255) that is used by every other server pool of the primary POP group 106.

Within a given server pool of the primary POP group 106, each server has a unique address. However, duplicate addresses are used across the different server pools of the primary PoP group 106. For example, the Seattle-based server pool includes a first number of servers with addresses selected from a given address block and the Chicago-based server pool includes a second number of server with addresses selected from the same address block, with duplicative addresses being permissible across the two different server pools (e.g., some or all of the addresses used in the Chicago-based server pool are duplicative of addresses used in the Chicago-based server pool).

Each server of the secondary POP group 108 is associated with a second IP address block that is different from the address block associated with each server pool in the primary PoP group 106. By example, the secondary POP group 108 is shown to consist of a single server pool 146 (e.g., in a same data center) that includes a block of servers each assigned to an address selected from the block 10.0.2.0/24.

All servers in both the primary POP group 202 and the secondary POP group 214 are configured to serve the web content of a same domain such that the user experience is unaltered or substantially unaltered irrespective of which of the domain server 102 serves the user's request to access the domain content. In one implementation consistent with FIG. 1, the primary POP group 206 includes servers that are more geographically dispersed than servers in the secondary POP group 214. As used herein, "more geographically dispersed" means distributed across a larger geographical area. For example, the primary POP group 106 includes different server pools located in a different major U.S. cities while the servers in the secondary PoP group 108 are all located in a same data center or distributed among a small number of data centers such that there exists more limited geographical representation of the secondary PoP group 108 in comparison to the primary POP group 106.

In one implementation, the primary POP group 106 includes a greater total number of servers than the secondary POP group 108. For example, the primary POP group 106 includes hundreds of servers spread across ten or more different physical data centers in different cities, while the secondary PoP group 108 includes a comparatively smaller number of servers characterized by various features indicative of a higher level of reliability than those of the primary POP group 106.

For internet traffic to reach any given server in the primary POP group 106 or the secondary PoP group 108, the server must be "online," a term used herein to imply that the server is connected to the internet and actively advertising its route to the BGP router network 132. As mentioned above, the BGP router network 132 implements routing logic that identifies, for each individual domain request from a client device 112, a server within a selected PoP group that can be reached from the client device 112 with lowest latency. If, for example, the client device 112 is located in Seattle, it may be that the Seattle-based server in the primary PoP group 106 can be reached with lower latency or another next-closest server in the group if the Seattle server is experiencing a high volume of traffic.

In one implementation, the servers in the secondary POP group 108 are known to exhibit better performance and/or reliability characteristics as compared to the servers in the primary POP group 106. For example the servers in the secondary POP group 108 may be located in a data center with relaxed space consumption limitations and/or power limitations as compared to those imposed on servers in the primary POP group 106, effectively allowing those servers in the secondary PoP group 108 to provide a higher level of reliability at increased operational cost.

On occasion, select servers or select pools of the servers within the primary PoP group 106 may be brought offline, either deliberately, such as due to a maintenance issue, or as a consequence of the server being overloaded, crashing, experiencing hardware problems, etc. As used herein, the term "offline" is used to imply that the server or server pool is not actively advertising its route to the BGP router network 132. For example, the first POP server pool may stop advertising its route to the BGP router network 132 when maintenance is performed. This temporarily removes the entire Seattle-based server pool from the primary POP group 106. An offline POP server pool may, in some scenarios, be powered on and/or connected to a local network.

BGP routing logic is well known and considered to be external to the scope of this disclosure except to note that existing BGP routing logic does not include a failsafe to protect server nodes that are first returning to an online state after being offline for a period of time. At the moment that a server pool (e.g., the first POP server pool 130) begins advertising its route to the BGP router network 132 after being in an offline state, the BGP router network 132 identifies the server pool as one that can be reached with low latency (e.g., since the server is not receiving any traffic). Consequently, the BGP router network 132 immediately begins directing a large surge of traffic to the previously-offline server pool without metering the incoming surge in-pace to prevent the traffic from overwhelming the server pool. This surge of traffic is, in many cases, sufficient to drive the server pool into an unhealthy state such as by consuming all of the server's bandwidth and/or by allowing the server's CPU and memory consumption to reach unhealthy levels. This can result in user connectivity issues and in some cases, server health cannot be restored without taking the server offline again.

The system 100 includes a traffic management agent 126 and a health evaluator 124 that work in conjunction to prevent the foregoing scenario by selectively "shedding" a portion of domain traffic away from the primary POP group (e.g., the POP group that serves substantially all domain requests during nominal system operations). As used herein, "substantially all" domain requests refers to 95% or more. This traffic that is shed from the load received at the primary POP group 106 is instead selectively directed to the secondary PoP group 108, which may be understood as a fallback group that services domain traffic when the primary POP group 106 has one or more unhealthy servers or servers that are for various reasons deemed at high risk of becoming unhealthy.

In one implementation, the volume of traffic selectively "shed" from the primary PoP group 106 is dynamically changed over time. For example, the secondary POP group 108 may begin receiving a majority of the domain traffic in the moments following return of a server in the primary PoP group 106 to an online state. Then, this traffic directed to the secondary PoP group 108 is gradually decreased (and instead directed back to the primary PoP group 106) until the primary POP group 106 is again receiving a majority of the domain traffic or substantially all of the domain traffic. For example, FIG. 1 illustrates that a client request to access the domain is routed by BGP routers 140 either along a first path 134 to a server in the address block 10.0.2.0/24 or instead a second path 136 to a server in the address block 10.0.1.0/24. When one of the server pools in the primary PoP group 106 has just returned to the online state, the first path 134 is selected to route the client request a first percentage of the time (e.g., 5%) and the second path 136 is selected to route the client request the remainder of the time (e.g., 95%). As more and more time passes, the percentage of requests directed along the first path 134 is increased while the percentage of requests directed along the second path 136 is decreased proportionately until substantially al requests (e.g., 95% or more) are again being served by servers in the primary POP group 106.

The above-mentioned selective load shedding from the primary POP group 106 is described below with respect to an individual domain request 103 placed by client device 112. In this example, a user types a domain name into a web browser (e.g., www.thisdomain.com). The user's domain request is directed to a resolver of the user's internet service provider (ISP), shown in FIG. 1 as ISP resolver 114 which is, for example, a recursive resolver. The ISP resolver 114 sends a number of recursive queries 120 to various servers (e.g., a root name sever, a top level domain server, an authoritative nameserver, etc.), collectively represented by "DNS server stack 116," in an effort to resolve the requested domain name to a destination IP address of a server that serves content of the domain.

In one implementation, the recursive queries 120 entail a first query to a root name server that responds by directing the ISP resolver 114 to a top-level domain (TLD) that maintains records for all domains that share a common domain extension (e.g., .com). The ISP resolver 114 then queries the TLD nameserver with the requested domain name ("thisdomain"), and the TLD nameserver directs the ISP resolver 114 to an authoritative name server for the requested domain that, in turn, stores a mapping associating the requested domain another destination, which may be either an IP address for a server of the domain or a CNAME (alias) for the domain. In the event that the authoritative name server redirects the ISP resolver 114 to a CNAME (alias domain), the ISP resolver 114 executes further recursive queries to resolve the CNAME to a destination IP address. Depending on characteristics of the network implementing the disclosed technology, the recursive queries 120 may entail any number of queries involving resolution of any number of CNAMEs used by the domain.

At some point within the recursive look-up process, the request is directed to a DNS server 118, which represents a lower level DNS server that implements aspects of the disclosed technology to manage traffic on behalf of the requested domain. In one implementation, the DNS server 118 is reachable via a CNAME that is supplied by the authoritative name server. For example, the CNAME is a name that is assigned to the domain by a third party service provider that the domain has contracted with to provide content delivery services to the domain, such as services to support scalability, performance, and/or security. One example of a third-party service that provides content delivery services is Azure Front Door®, owned by Microsoft®. In one implementation consistent with the foregoing, the ISP resolver 114 queries an authoritative name server for the domain originally requested by the client device 112 (e.g., www.thisdomain.com), and the authoritative name server responds with a CNAME (e.g., www.thisdomain.com.1-005.1-msedge.net) that the third party service provider has assigned to the domain. This ISP resolver 114 then resolves this CNAME to the DNS server 118 that stores a record including the CNAME.

Although not necessary to implementation, it is common for each different POP server pool in the primary PoP group 106 to be associated with a different local DNS server that performs the functionality described below with respect to the DNS server 118. For example, each one of the illustrated POP server pools includes or is locally networked with a DNS server that stores a record associated with the domain (or a CNAME of the domain). The request from the client device 112 is directed by default to a select one of these DNS servers (e.g., the DNS server 118) that happens to be located at the server pool location that can be reached from the location of the client device 112 with the lowest latency. If, for example, the client device 112 is in Seattle, the DNS server 118 that receives the request may be a DNS server physically located at a Seattle data center in the local network of the first POP server pool 130.

In one implementation, the functionality described below with respect to the DNS server 118 is implemented by each of multiple DNS servers locally networked to different respective ones of the POP server pools in the POP server group 106.

The DNS server 118 includes the health evaluator 124 and the traffic management agent 126, each of which include primarily software or a combination of hardware and software. The health evaluator 124 monitors operational data 144 (e.g., health metrics) for all of the servers in the primary POP group 106 and computes a health metric 142 for the primary PoP group 106 on a recurring basis, such as at regular intervals (e.g., once every 10 seconds). The health evaluator 124 provides the health metric to the traffic management agent 126, and the traffic management agent 126 implements POP selection logic that selects either the primary PoP group 106 or the secondary PoP group 108 to service the domain request. This selection is, in one implementation, based on a most-recently determined health metric 142 for the primary POP group 106. Based on the value of the health metric 144, the DNS server 118 directs the request to an address associated with the primary PoP group 106 (e.g., selected from the address block 10.0.2.0/24) or an address associated with the secondary PoP group (e.g., selected from the address block 10.0.1.0/24).

In one implementation, the DNS server 118 directs the request by selecting between two CNAMES—e.g., a first CNAME (e.g., CNAME1) that resolves to an IP address within the address block assigned to the primary POP group 106 or a second different CNAME (e.g., CNAME2) that resolves to an IP address within the address block assigned to the secondary PoP group 108.

Figure 2:
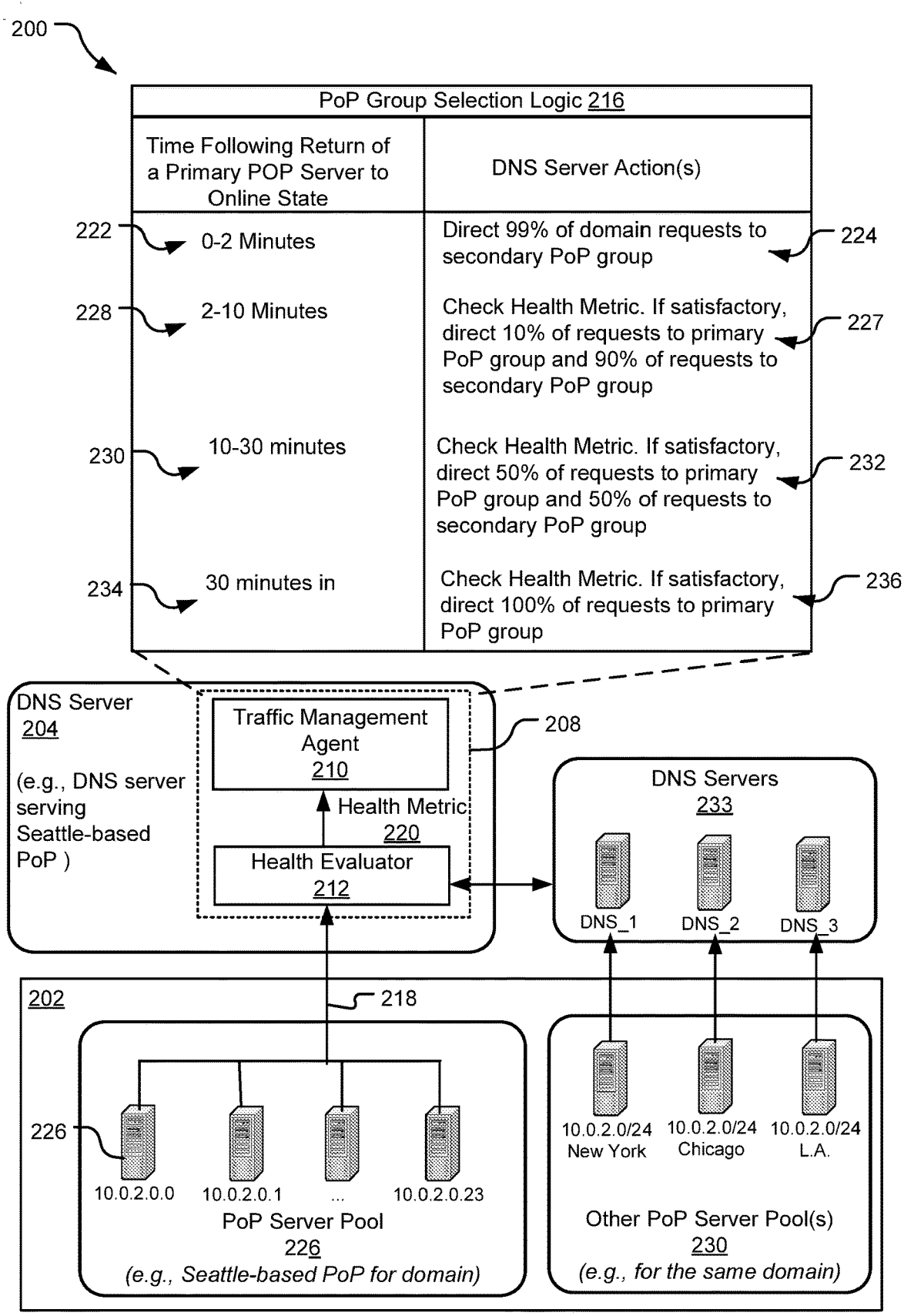
FIG. 2 illustrates aspects of system that performs load shedding actions to protect each server in a shared address space from overload under certain conditions, such as following the return of an individual server to an online state after being offline for a period of time.

Exemplary logic implemented by the traffic management agent 126 to select between the primary and secondary POP groups is discussed with greater detail with respect to FIG. 2. However, in one implementation, the traffic management agent 126 directs all or substantially all (e.g., 95% or more) of the incoming requests to the CNAME associated with the primary PoP group 106 during nominal operations, excluding times when it is known that one of the servers in the primary PoP group 106 is unhealthy or at-risk of becoming unhealthy in the near future. For example, when the health data 144 indicates that a POP server pool within the primary PoP group 106 has just returned to the online state and/or is unhealthy by other predefined criteria, the traffic management agent 126 directs a first percentage of the incoming domain traffic to the secondary POP group 108 instead of the primary PoP group 106, thereby diminishing the total volume of traffic that is received by the primary PoP group 106 as compared to nominal operations.

In one implementation, the amount of traffic being shed away from the primary PoP group 106 initializes at a high value when the shedding action is initiated (e.g., 95% or more of incoming requests are shed initially) and is gradually decreased in time with each decrement in the load shed being conditional, at least in part, upon a value of the health metric 142 computed for a corresponding point in time. This methodology ensures that the primary PoP group 106 is healthy enough to manage traffic flow during the entire ramp-up that follows the initial load shed without causing noticeable latencies and/or connectivity issues for users with active connections to the domain.

After selecting either the primary Pop group 106 or the secondary POP group 108 to service a given request, the traffic management agent 126 returns the associated CNAME (e.g., CNAME1 or CNAME2). If the primary POP group 106 is selected to receive the request, the DNS server 118 returns the first CNAME (e.g., CNAME 1) and in some cases, returns an IP address that is associated in a DNS record with the first CNAME. In other cases, one or more additional recursive queries are performed to resolved the first name to a destination IP address 131 of the address block assigned to the primary POP group 106.

If, in contrast, the secondary POP group 108 is selected to receive the request, the DNS server 118 returns the second CNAME (e.g., CNAME2), the request is then routed to an authoritative name server for the second CNAME (e.g., a DNS server locally networked to the secondary PoP group 108). This authoritative server for the CNAME resolves the second CNAME to the destination IP address 131 which is, in this case, an address selected from the address block assigned to the secondary POP group 108.

The ISP resolver 114 provides the destination IP address 131 to the client device 112, and the client device 112 then tries to access the destination IP address 131 through various BGP routers 140 of the BGP network. Provided there exist multiple server pools associated with the destination IP address 131, the BGP router network 132 again implements routing logic to identify a select one of the multiple server pools that can process the request with lowest latency. If, for example the client device 112 is located in Seattle, this routing logic may route the request to the first POP server pool 130 (e.g., a Seattle-based PoP). Notably, the secondary PoP group 108 is shown to include a single server pool 146. In this example, each time the DNS server 118 selects the secondary POP group 108, the associated request is directed to the single server pool 146. In other implementations, the secondary PoP group 108 includes multiple server pools and server pool selection is performed in a manner the same or similar as that described above with respect to the primary POP group 106.

After selecting the POP server pool at the destination IP address 131 that can be reached with lowest latency, the BGP routers 140 direct the request to the selected server pool and the client device 112 establishes a data flow with the selected server via an appropriate data transport protocol.

In the implementation shown, both the traffic management agent 126 and the health evaluator 124 are executed on the same machine as the DNS server 118; however, in other implementations, one or both of these software components are executed on machine(s) external to and in communication with the DNS server 118.

Effectively, the actions of the traffic management agent 126 and health evaluator 124 function to protect a POP server pool in the primary PoP group 106 that is just returning to an online state by reducing traffic that would otherwise reach the primary PoP group 106 for a period of time following the server's return to an online state. This reduction in traffic ("load shed") is realized by directing the load that is shed from the primary PoP group 106 to the secondary POP group 108.

FIG. 2 illustrates aspects of another system 200 that performs load shedding actions to protect each server in a shared address space from overload under certain conditions, such as following the return of an individual server to an online state after being offline for a period of time. In the system 200, load shedding actions are selectively performed by load shed components 208 including a traffic management agent 210 and a health evaluator 212. The load shed components 208 are shown implemented on a DNS server 204 but may, in other implementations be implemented in full or in part on other machine(s) communicatively coupled to a DNS server.

The DNS server 204 is a server that is queried, by a user's ISP resolver (not shown), during a series of recursive queries performed to resolve a user-provided domain name to a destination IP address. In one implementation, the ISP resolver sends a query to the DNS server 204 after a CNAME is returned by an authoritative name server for a user-requested domain name. For example, the DNS Server 204 is a server managed by a third party service provider that provides content delivery services for the user-requested domain, and all requests to access the domain are managed by servers of the third party service provider.

By example, the load shed actions are discussed below with respect to a single domain. Content of this single domain can be served to a requesting user device by each server within a primary PoP group 202 and a secondary PoP group (not shown). Servers in the primary PoP group 202 are associated with a first IP address block (e.g., 10.0.2.0/24) while servers in the secondary PoP group 214 are associated with a second different IP address block (e.g., 10.0.1.0/24). Characteristics of the primary POP group 202 and the secondary PoP group 214 that are not described explicitly with respect to FIG. 2 may be assumed the same or similar to those described above with respect to FIG. 1.

In FIG. 2, the DNS server 204 is assumed to be locally networked to a POP server pool 226 of the primary POP server group 202 (e.g., the Seattle-based POP server pool for a domain with POP server pools in multiple cities). For example, each of multiple other server pools 230 in the primary POP server group 202 is locally networked to a different one of DNS servers 233 (e.g., DNS_1, DNS_2, DNS_3), each of which locally execute an identical instance of the load shed components 208.

In response to receiving, at the DNS server 204, an individual request to access the domain, the load shed components 208 execute PoP group selection logic 216 to determine whether to direct the individual request to the first IP address block of the primary PoP group 202 or the second IP address block of the secondary POP group 214.

In the example of FIG. 2, it is assumed that all or substantially all requests to access the domain are directed to the primary POP group 202 during nominal operations, excluding times when one or more servers in the primary PoP group 202 are unhealthy and/or exhibiting characteristics indicative of a high overload risk. In different implementations, the PoP group selection logic 216 specifies different rules defining criteria that, when satisfied, trigger shedding of a portion of the incoming domain traffic from the primary POP group 202. This traffic that is shed from the primary POP group 202 is instead directed to the secondary PoP group (not shown).

By example, the specific rules illustrated with respect to the POP group selection logic 216 of FIG. 2 pertain to a scenario where the POP server pool 226 in the primary PoP group 202 is deemed to be at high risk of becoming unhealthy due to the fact that it has recently returned to the online state after being offline for a period of time. However, in other implementations, the POP group selection logic 216 includes other load shed rules not shown in FIG. 2 that trigger similar load shed actions in different scenarios, such as when any individual server and/or server pool in the primary PoP group 202 is exhibiting certain characteristic(s) predefined as indicative of poor health, even if the server(s) have not recently returned to the online state.

In the system 200, each server in the POP server pool 226 provides operational metrics 218 to the health evaluator 212 executing on the locally-networked DNS server 204. Likewise, it is assumed that each server in each of the other POP server pools 230 provides the same type of operational metrics to an instance of the health evaluator 212 executing on a corresponding one of the DNS servers 233 serving the associated pool. In one implementation, each different instance of the health evaluator 212 is in communication with all other instances of the health evaluator 212 that serve the primary POP group 202. These different instances of the health evaluator 212 share their respective collected information (e.g., the operational metrics 218) such that each and every instance of the health evaluator 212 receives the operational metrics 218 for each different one of the POP server pools in the primary PoP group 202.

For each different one of the server pools in the primary POP server group 202, the operational metrics 218 include, for example, the amount of time that the server pool has been online (e.g., advertising its route the BGP) and health data indicative of the health of various machines within the server pool, such as CPU usage, memory utilization, I/O utilization, rate of failed http requests delegated to the machine, machine latency, internal temperature, power consumption, peering utilization, etc.

Based on the operational metrics 218 that the health evaluator 212 receives in association with each different one of the POP server pools in the primary POP group 202, the health evaluator 212 computes a health metric 220 for the primary POP group 202 (e.g., the group as a whole). The traffic management agent 210 uses the health metric 220, either alone or in combination with other information, to determine a first percentage of domain traffic to shed from the primary POP group 202 and to instead direct to the secondary POP group (not shown) of the domain.

Notably, the implementation of FIG. 2 implements the POP group selection logic 216 based on the health metric 220 (e.g., which is repeatedly computed) for the primary PoP group 202. In some implementations, the health metric 220 is not computed for the secondary PoP group 214. In still other implementations, the health metric 220 is computed for the secondary PoP group 214 as well as for the primary POP group 202, and data is selectively distributed among the two POP groups based on the general health (as indicated by the health metric) of both PoP groups.

Although not explicitly shown in FIG. 2, it is assumed that the traffic management agent 210 has access to a metric indicating the time that that each POP server pool in the primary PoP group 202 has been continuously online. This online time is used in addition to the health metric 220 to implement the POP group selection logic 216.

In another implementation, the health metric 220 takes into account the continuous online time of each server in the primary POP group 202. When, for example, one of the server pools in the primary POP group 202 has just returned from the offline state, the health metric 220 is indicative of a lesser degree of health. As time continues to pass while the newly-returned server pool remains online, the health metric 220 changes in a manner indicative of improved health (e.g., the health metric reflect gradually improving health as time passes, assuming all server pools remain online and all other aspects of the system remain healthy/unchanged).

In one implementation, the POP group selection logic 216 is executed in response to determining, at the DNS server 204, that the first POP server pool 226 has returned online within a defined recency time interval (e.g., within the past 30 seconds, 1 minute, or other interval). For illustration of concept, the POP group selection logic 216 indicates specific examples of traffic redirect rules (e.g., redirect rules 224, 227, 232, 234) selectively implemented at different points in time following the return of the first POP server pool 226 226 to an online state.

In the first few moments (e.g., 0-2 minutes) immediately following the return of the first POP server pool 226 to the online state, a small, predefined percentage (e.g., 1%) of domain traffic is directed to the primary POP group 202 and the vast majority of the domain traffic (e.g., 99%) is shed from the primary PoP group 202 and instead directed to the secondary POP group 214.

In a next consecutive time interval 228 (e.g., 2-10 minutes following the return of the first POP server pool 226 to the online state), another redirect rule 227 is applied. The redirect rule 227 provides for checking the health metric 220 and, provided that the health metric 220 satisfies a defined baseline indicative of satisfactory PoP group health, reducing the volume of traffic being shed from the primary PoP group 202 by a predefined amount. In the illustrated example, the entails increasing the percentage of requests sent to the primary PoP group 202 from 1% to 10% while the remainder of the traffic is sent to the secondary PoP group 214.

During a still a next consecutive time interval 230 (e.g., 10-30 minutes following the return of the server 226 to the online state), another redirect rule 332 provides for again checking the health metric 220 and, provided that the health metric 220 continues to satisfy the defined baseline, further reducing the volume of traffic being shed from the primary PoP group 202. Here, the percentage of requests sent to the primary POP group 202 is increased from 10% to 50% while the remainder of the traffic is sent to the secondary PoP group 214.

In the illustrated example, an interval 230 commences after a threshold period of time has elapsed following return of the first POP server pool 226 to the online state (e.g., 30 minutes). At this point in time, a redirect rule 336 provides for again checking the health metric 220 and, provided that the health metric 220 continues to satisfy the defined baseline, increasing the percentage of traffic received at the primary POP group by an amount that restores the system to a state of nominal operations. For example, the percent of traffic received by the primary POP group is increased from 50% to 100% or some other value representing substantially all of the domain traffic (e.g., greater than 95%).

If it is determined, upon any individual check of the health metric 220 with respect to the redirect rules 224, 227, 232, or 236 that the health of primary PoP group 202 does not satisfy the defined baseline or other applicable criteria, alternative conditions may kick in. For example, the traffic management agent 210 declines to increase the volume of domain requests to the primary POP group 202 during the associated interval or, instead, increases by a lesser amount than the increase provided in scenarios where the health metric 220 does satisfy the defined baseline at the start of the time interval (e.g., 222, 228, 230, 236) associated with the rule.

Both the example redirect rules and the example time intervals shown in FIG. 2 are subject to variation from one implementation to another. However, the general pattern of gradually increasing traffic to the primary PoP group 202 as time elapses following return of a primary POP server pool to the online state may hold true across a variety of implementations executing variations on the POP group selection logic 216.

As discussed elsewhere herein, the BGP routing network implements a routing methodology that directs each domain request to the POP server pool of the domain that can respond with lowest latency. When the first POP server pool 226 returns online after being offline for a period of time, BGP determines that this pool can be reached with low latency (e.g., because there is no traffic at the pool) and responds by directing a large surge of traffic to the first POP server pool 226 at a rate that overwhelms the capability of these servers to manage through-traffic. The above-described POP group selection logic 216 prevents this surge of traffic at the first POP server pool 226 by shedding a large fraction of domain traffic to the secondary POP group 214 in the moments following return of the first POP server pool 226 to this online state. This inherently reduces the total traffic that is available to be potentially sent to the first POP server pool 226 during those first few moments after returning online. Since the volume of domain traffic sent to the primary POP group 202 is increased in a controlled and gradual manner, it is ensured that a POP server group returning to an online state is unlikely to receive an initial traffic surge that forces the server into an unhealthy state.

Figure 3:
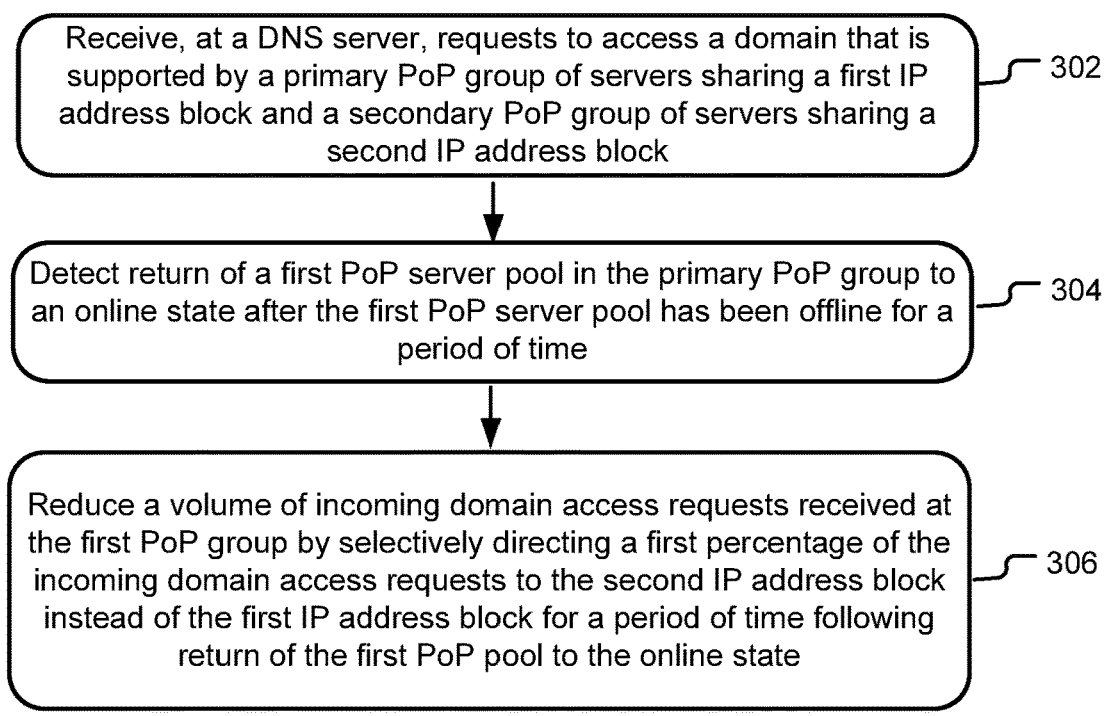
FIG. 3 illustrates example load management operations for servers in a shared address network architecture.

FIG. 3 illustrates example load management operations 300 for servers in a shared address network architecture. A receiving operation 302 receives, at a DNS server, requests to access a domain. The domain is supported by a plurality of servers arranged in two different server groups including a primary PoP group of servers associated with first IP address block and a secondary group of servers associated with a second IP address block. In one implementation, the primary POP group includes multiple POP server pools, with each of the server pools corresponding to a different general geographic location. For example, the primary POP group includes a first server pool in Seattle, another server pool in New York, etc. During nominal operations, such as when all of the plurality of servers are determined to be in good health and not at considerable risk for overload, all or substantially all domain traffic is directed to the first IP address block.

A monitoring and detecting operation 304 monitors operational metrics of servers in the primary PoP group and detects the return of a first POP server pool in the primary PoP group to the online state after the first POP server pool has been offline for a period of time. In response to detecting the return of the first POP server pool to the online state, a load shed operation 306 reduces a total volume of incoming requests that are directed to the primary POP group by selectively directing a first percentage of the incoming requests to the second IP address block instead of the first IP address block for a period of time following return of the first POP server pool to the online state.

In one implementation, the first percentage of traffic directed to the second IP address block is gradually reduced as time elapses following the return of the first server to the online state. The first percentage is, in some implementations, based on a health metric that is computed based on health data received for some or all servers in the primary PoP group. For example, a greater volume of the domain traffic is directed to the secondary PoP group at times when the health metric indicates a lower overall health of the primary PoP group than at times when the health metric indicates a higher overall health of the primary PoP group.

Figure 4:
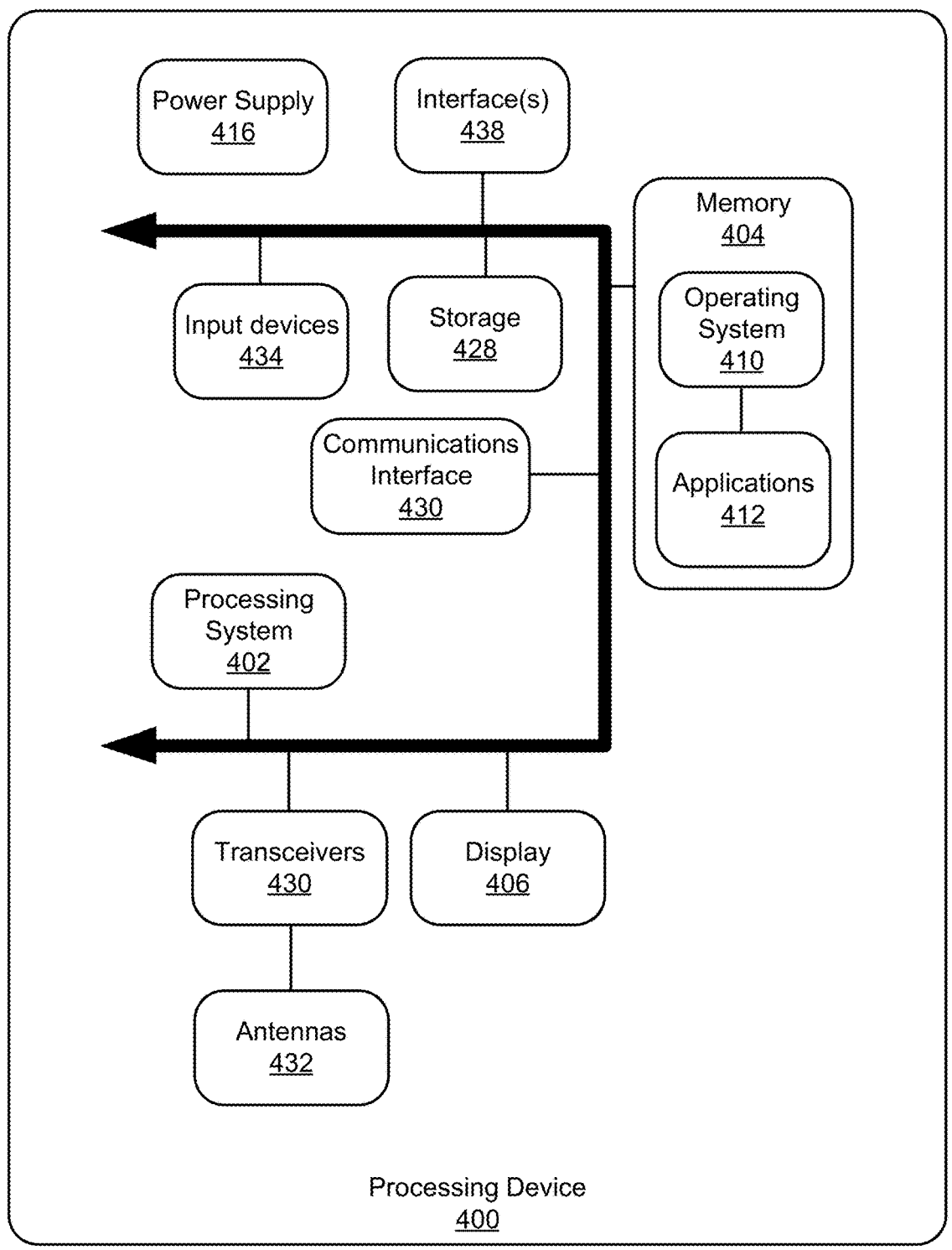
FIG. 4 illustrates an example schematic of a processing device suitable for implementing aspects of the disclosed technology.

FIG. 4 illustrates an example schematic of a processing device 400 suitable for implementing aspects of the disclosed technology. The processing device 400 includes a processing system 402, memory 404, a display 406, and other interfaces 408 (e.g., buttons). The processing system 402 may each include one or more CPUs, GPUs, etc. The memory 404 generally includes both volatile memory (e.g., RAM) and non-volatile memory (e.g., flash memory). An operating system 410, such as the Microsoft Windows® operating system or any other operating system, resides in the memory 404 and is executed by the processor unit(s) 402.

One or more applications 412 (e.g., the traffic management agent 126 and the health evaluator 124 of FIG. 1) are loaded in the memory 404 and executed on the operating system 410 by the processor unit(s) 402. The applications 412 may receive inputs from one another as well as from various input local devices such as a microphone 434, input accessory 435 (e.g., keypad, mouse, stylus, touchpad, gamepad, racing wheel, joystick), and a camera 432. Additionally, the applications 412 may receive input from one or more remote devices, such as remotely located servers or smart devices, by communicating with such devices over a wired or wireless network using more communication transceivers 430 and an antenna 438 to provide network connectivity (e.g., a mobile phone network, Wi-Fi®, Bluetooth®). The processing device 400 may also include one or more storage devices 428 (e.g., non-volatile storage). Other configurations may also be employed.

The processing device 400 further includes a power supply 416, which is powered by one or more batteries or other power sources, and which provides power to other components of the processing device 400. The power supply 416 may also be connected to an external power source (not shown) that overrides or recharges the built-in batteries or other power sources.

The processing device 400 may include a variety of tangible computer-readable storage media and intangible computer-readable communication signals. Tangible computer-readable storage can be embodied by any available media that can be accessed by the processing device 400 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 400. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A system comprising:
   a primary point-of-presence (POP) group of servers including multiple server pools in different geographic locations, each server in the primary POP group being reachable at an address of a first internet protocol (IP) address block and configured to serve content of a domain;
   a secondary PoP group of servers, each server in the secondary POP group being reachable at an address of a second IP address block and configured to serve the content of the domain; and
   a traffic management agent stored in memory and configured to reduce a total volume of incoming requests received by the primary POP group for a period of time following a return of a first POP server pool in the primary PoP group of servers to an online state by selectively directing a first percentage of the incoming requests to the second IP address block instead of the first IP address block, and wherein the traffic management agent gradually decreases the first percentage of incoming requests directed to the second IP address block as time passes following the return of the first POP server to the online state.

2. The system of claim 1, further comprising:
   a health evaluator stored in the memory and configured to compute a health metric for the primary POP group, wherein the traffic management agent determines the first percentage of requests to direct away from the primary POP group of servers based on the health metric.

3. The system of claim 2, wherein the health metric for the primary PoP group of servers is computed based on health data received from the first POP server pool.

4. The system of claim 3, wherein the health data includes central processing unit (CPU) usage and memory usage for the first POP server pool.

5. The system of claim 2, wherein the traffic management agent and the health evaluator are both executed by a same DNS server.

6. The system of claim 1, wherein the secondary PoP group of servers includes fewer servers than the primary PoP group of servers and wherein the servers of the secondary PoP group are less geographically dispersed than the servers of the primary PoP group.

7. The system of claim 6, and wherein the traffic management agent directs substantially all incoming requests for the domain to the secondary POP group of servers for a first time interval immediately following the return of the first POP server pool to the online state.

8. The system of claim 1, wherein the traffic management agent directs substantially all of the incoming requests to the primary POP group of servers after a threshold period of time has elapsed following the return of the first POP server pool to the online state.

9. A method comprising:
   receiving, at a DNS server, requests to access a domain associated with both:
      a primary point-of-presence (POP) group of servers for the domain, the primary PoP group of servers including multiple server pools in different geographic locations, each of the servers in the primary POP group of servers being reachable via an address of a first internet protocol (IP) address block; and
      a secondary PoP group of servers for the domain, each server in the secondary PoP group being reachable via an address of a second IP address block;
   detecting return of a first POP server pool in the primary POP to an online state after the first POP server pool has been offline for a period of time; and
   reducing a total volume of incoming requests received by the first POP group of servers by selectively directing, by the DNS server, a first percentage of the incoming requests to the second IP address block instead of the first IP address block for a period of time following the return of the first POP server pool to the online state, wherein the first percentage of incoming requests directed to the second IP address block is gradually decreased as time passes following the return of the first POP server to the online state.

10. The method of claim 9, further comprising:
computing a health metric for the primary POP group of servers; and
determining the first percentage based on the health metric.

11. The method of claim 10, wherein the health metric for the primary PoP group is computed based on health data received from the first POP server pool.

12. The method of claim 11, wherein the health data includes central processing unit (CPU) usage and memory usage for the first POP server pool.

13. The method of claim 11, wherein substantially all of the incoming requests for the domain are directed to the primary POP group after a threshold period of time has elapsed following the return of the first POP server pool to the online state.

14. The method of claim 9, wherein the secondary PoP group includes fewer servers than the primary PoP group and wherein the secondary POP group is less geographically dispersed than the primary POP group.

15. The method of claim 9, further comprising directing substantially all incoming requests for the domain to the secondary POP group for a first time interval immediately following the return of the first POP server pool to the online state.

16. One or more computer-readable storage media encoding computer-executable instructions for executing a computer process, the computer process comprising:
determining that a first point-of-presence (PoP) server pool within a primary point-of-presence (POP) group of servers has returned to an online state within a defined recency time interval, the primary PoP group including multiple server pools in different geographic locations, each server of the multiple server pools sharing a first internet protocol (IP) address block and being configured to serve content of a domain;
determining a first percentage of incoming requests for the domain to direct to a second IP address block instead of the first IP address block in response to the return of the POP server pool to the online state, the second IP address block being shared by a secondary POP group of servers configured to serve the content of the domain; and
directing the first percentage of incoming requests to the second IP address block instead of the first IP address block for a threshold period of time following the return of the first POP server pool to the online state; and
gradually decreasing the first percentage of the incoming requests directed to the second IP address block while gradually increasing a second percentage of the incoming requests directed to the first IP address block as time passes following the return of the first POP server pool to the online state.

17. The one or more computer-readable storage media of claim 16, wherein the computer process further comprises:
determining a health metric characterizing the primary PoP group of servers; and
determining the first percentage of requests to direct away from the primary POP group of servers based on the health metric.

* * * * *